Patented Jan. 17, 1950

2,494,708

UNITED STATES PATENT OFFICE 2,494,708

STABLE BITUMINOUS EMULSION AND PREPARATION THEREOF

Donald C. Jesseph, Los Angeles, Calif.

No Drawing. Application July 27, 1946,
Serial No. 686,721

4 Claims. (Cl. 252—311.5)

My invention relates to emulsions of water and bituminous material in which the water is the continuous phase and the bitumin is suspended in the water as the disperse phase. By bituminous materials I mean asphalt or so-called "heavy road oil" or similar material containing asphalt or other tar having characteristics similar to asphalt, for example, coal tar.

Such emulsions are largely used in road construction and soil stabilization to protect and bind together the particles of aggregate used in such construction and stabilization and to render the finished mixture more resistant to water and displacement under load. It is necessary that such emulsions have a certain degree of stability so that they can be stored and shipped without separating into their component parts, bitumen and water. The principal necessity for stabilizing such emulsions arises, however, from the fact that emulsions which are of satisfactory stability as to keeping and shipping may still tend, for physical or chemical reasons, to break too fast when mixed with mineral aggregates, which are usually broken rock, sand, and allied substances.

It is an object of my invention to so stabilize a bituminous emulsion to be used in road construction or soil stabilization as to give it the proper degree of stability to enable it to be conveniently and successfully used in such construction or stabilization. This I accomplish by producing an emulsion of asphaltic or other bituminous material in water, the water being of the continuous phase, by means already well known in the art, for example, by agitating the material with an emulsifying agent such as a warm aqueous solution of caustic soda, and thereafter stabilizing the preformed emulsion produced against rapid break by adding thereto a suitable stabilizing agent.

It is now common in the art to use such stabilizing agents, and my invention resides in the provision of a novel stabilizing agent, namely, a substance I call "ammonium-ligno-sulfonate." This stabilizing agent is produced by treating wood or other cellulosic material with an aqueous solution of ammonium bisulfite, which results in the production of an unsaturated aqueous solution containing ammonium-ligno-sulfonate. I use the term "a solution containing ammonium-ligno-sulfonate" to denote the product resulting from the treatment of such cellulosic material with ammonium bisulfite, although I recognize that other substances than ammonium-ligno-sulfonate are present in the solution, and chemists are not able to fully explain the chemical composition of ammonium-ligno-sulfonate or these other materials. I have found that a very satisfactory stabilizing agent is produced by treating cellulosic material, and especially wood, with an aqueous solution of ammonium bisulfite, and I suspect that this solution contains relatively small amounts of substances other than ammonium-ligno-sulfonate, which substances may be beneficial as stabilizers or at least do not prevent the solution from acting as an efficient stabilizer.

I prefer to concentrate this unsaturated solution by evaporation of the water to produce an aqueous solution containing about 40% of solids (on a dry basis), which are largely ammonium-ligno-sulfonates. I then add this concentrated solution to the preformed emulsion, using this solution to an amount equal to about four per cent (4%) of the volume of the emulsion. The stabilizing agent is then thoroughly mixed with the preformed emulsion by agitation. This can be done as a supplemental step of the process by which the emulsion is formed.

It should be obvious that adding 4% of a solution containing 40% solids is equivalent to adding 1.6% of solids, that if 2% of such solution is added it is equivalent to 0.8% of solids, and that 6% is equivalent to 2.4% of solids.

The stabilizing agent acts as a protective colloid reinforcing the emulsifier, used to produce the emulsion, at the interface between the particles of bituminous material and the continuous water phase. An emulsion so stabilized does not readily break into masses of its constituents, due to chemical or physical causes, while it is being mixed with aggregates used in road construction or soil stabilization, but does break slowly in the finished mixture, leaving the bituminous material as a protective coating for the particles of aggregate and serving as a solid or semi-solid binder between these particles.

The time required for the emulsion to break when it is in place in the aggregate can to a certain extent be regulated by the amount of stabilizing agent that is used, the proportion of four per cent (4%) being one which will be found satisfactory under nearly all conditions of humidity and temperature usually found in such construction in the United States, and which will produce a stabilized emulsion which is practically satisfactory anywhere. Where either low humidity or high temperature, or both, prevail, the use of the stabilized emulsion will be facilitated by the use of more of the stabilizing agent, and vice versa. The 4% proportion may be varied in practice from 2% to 6% to meet climatic conditions of varying types of aggregate.

I claim as my invention:

1. A process of producing an emulsion, which is more stable than previous emulsions, in which water is the continuous phase and bitumen is the disperse phase, which consists in: mixing water and bituminous material to form a relatively unstable, preformed emulsion in which the water is the continuous phase and the bituminous material is dispersed in separate particles in the water; and thereafter adding ammonium-ligno-sulfonate to said preformed emulsion.

2. A process of producing an emulsion, which is more stable than previous emulsions, in which water is the continuous phase and bitumen is the disperse plane, which consists in: mixing water and bituminous material to form a relatively unstable, preformed emulsion in which the water is the continuous phase and the bituminous material is dispersed in separate particles in the water; and thereafter adding from two percent (2%) to six percent (6%) of ammonium-ligno-sulfonate to said preformed emulsion.

3. An emulsion consisting of water and bituminous material in which water is the continuous phase and bituminous material is the disperse phase, said emulsion being stabilized by ammonium-ligno-sulfonate mixed therein.

4. An emulsion consisting of water and bituminous material in which water is the continuous phase and bituminous material is the disperse phase, said emulsion being stabilized by from two percent (2%) to six percent (6%) of ammonium-ligno-sulfonate mixed therein.

DONALD C. JESSEPH.

REFERENCES CITED

The following references are of record in the file of this patent:

UNITED STATES PATENTS

| Number | Name | Date |
| --- | --- | --- |
| Re. 15,944 | Kirschbraun | Nov. 11, 1924 |
| 1,201,301 | Hurt | Oct. 17, 1916 |
| 1,738,798 | Richter et al. | Dec. 10, 1929 |
| 2,132,607 | Davis | Oct. 11, 1938 |

Certificate of Correction

Patent No. 2,494,708 January 17, 1950

DONALD C. JESSEPH

It is hereby certified that error appears in the printed specification of the above numbered patent requiring correction as follows:

Column 3, line 17, for the word "plane" read *phase*;

and that the said Letters Patent should be read with this correction therein that the same may conform to the record of the case in the Patent Office.

Signed and sealed this 6th day of June, A. D. 1950.

[SEAL]

THOMAS F. MURPHY,
*Assistant Commissioner of Patents.*